June 1, 1965
R. M. DYKSTERHOUSE
3,187,119
SWITCH CONTACT STRUCTURE WITH EMBEDDED SPRING BIASING MEANS
Filed Aug. 4, 1961
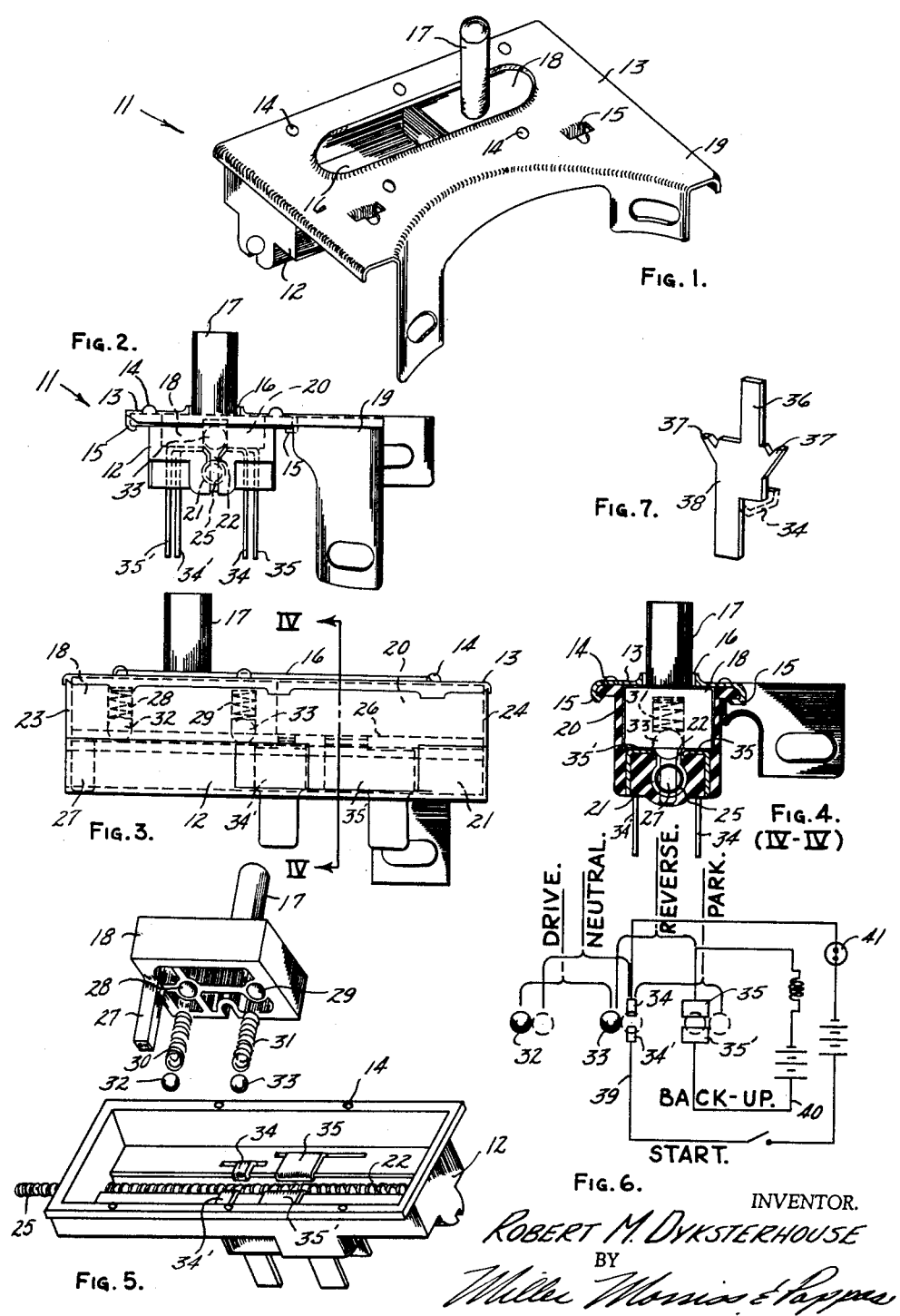
INVENTOR.
ROBERT M. DYKSTERHOUSE
BY
Miller Morris & Pappas
ATTORNEYS United States Patent Office 3,187,119
Patented June 1, 1965

3,187,119
SWITCH CONTACT STRUCTURE WITH EMBEDDED SPRING BIASING MEANS
Robert M. Dyksterhouse, Charlevoix, Mich., assignor, by mesne assignments, to Circuit Controls Corporation, Petoskey, Mich., a corporation of Michigan
Filed Aug. 4, 1961, Ser. No. 129,378
5 Claims. (Cl. 200—16)

The present invention relates to switches and more particularly to a switch for arming selected circuits in accord with movement and positioning imparted to the switch elements by manual or mechanical means. More particularly the present invention is directed to a straight line moving switch wherein a pair of spaced-apart balls are confined to a lineal path paralleling an axis through the ball center to establish selective closing contact with conducting contactor members provided in flanking spaced-apart relationship on each side of the ball path. Throughout the movement the balls are carried in the fixed spaced relation so that only one ball of the two balls bridges the contact pairs at any specific point in movement and wherein the line or spacing in respect to the balls and contacts establishes a selected sequencing. The switch acts against a spring biasing the switch to a normally open position. The balls move in a straight line defined by a groove comprised of case and contacts.

It will be appreciated that the switch described is an automotive switch for coordination of electrical equipment with manually set conditions, for example as in an automatic transmission. When an automatic transmission is in "drive" position, the starting circuit of the automobile is not armed and the motor cannot be started. If the motor is running, the transmission in "drive" position allows the automobile to be moved forwardly. To start the motor, however, the transmission lever must be shifted to the "park" or "neutral" position. In either of these positions the electrical circuits in an automobile must be armed for starting. However, intermediate these positions is the "reverse" position of the transmission. When the lever is located at this point, the automobile is prepared to back up. A selected automotive circuit must be armed at this point to energize back-up lights and the like. It is usual to provide a transmission control arm or lever radially extending from the steering column. The movement of the control arm in turn is monitored with a visual position indicator and the switch which accomplishes selective arming of starting and back-up circuits must reflect the arm position by establishing desired circuit contact. A number of switches have been adapted and proposed for this purpose. The present switch is particularly adapted for use with transmission positioning members. Its advantages include extreme simplicity, minimum number of moving parts, lineal movement in avoidance of radial binding, and tamper-proof operation. As will be appreciated, the switch described is substantially wear-proof and the rolling bridging contact as between ball and contactor surfaces assures excellent electrical contact efficiency and the entire switch withstands wear condition well. As the wear causes clearance variances in the switches and switch parts, the spring loaded balls compensate for the wear. This advantage of compensation for wear accrues from the unique use of the ball contact arrangement and assures a roller bearing anti-friction action as between case and actuator. The invention has these functions as objects and indeed extends to the provision of a switch of extreme economy consonant with automotive electrical standards. In addition, fabricating innovations will be readily perceived by those skilled in the art. Performance-wise the switch has received an excellent reception in the automotive industry.

In the drawing:

FIGURE 1 is a perspective view of a switch in accord with the present invention and indicating its environmental setting.

FIGURE 2 is an end elevation view of a switch in accord with the present invention.

FIGURE 3 is a side elevation view of the switch as shown in FIGURE 2.

FIGURE 4 is a cross section elevation view taken on the line IV—IV of FIGURE 3 and indicating the flush relationship of contactors in the actuator path and indicating the spring positioning pocket beneath the switch path.

FIGURE 5 is an exploded perspective view of the switch as set forth in FIGURES 1–4 with the cover bracket removed therefrom and indicating the contactors in turned over relationship preliminary to flush seating in nesting recesses in the case on either side of the longitudinal gap.

FIGURE 6 is a schmatic circuit diagram indicating the sequencing of the switch as it moves against its spring bias and illustrating the ball contact time interval as established by the lineal movement and rolling contact of ball with contactor strips.

FIGURE 7 illustrates, in perspective view, the accomplishment of combining contactor strips with blade type circuit connections and in phantom line showing the bending of the contactor strip in conformance with the switch path and indicating the upset of external shanks to form a gripping contact with the switch case. The bending and upsets are accomplished at assembly.

*General description*

In general the present invention comprises a switch case provided with a longitudinal path or track in groove form. In the groove a pair of spaced-apart balls are movable. The balls are retained in fixed apart relationship by an actuator or slider member. The groove communicates with a lower and parallel spring recess or pocket. Depending from the slider member is a tang that extends into the grooves and receives the biasing thrust of the case mounted compression spring. The compression spring is pocketed in the cylindrical recess parallel to and beneath the groove or path. The movement of the slider actuator is restricted by stop engagement with the case at either extreme of travel. Normally, it is biased as generally shown in FIGURE 1. The bias spring provided in the cylindrical guideway beneath the groove or path followed by the balls is at one end in yieldable contact with the case and at the other end bears on the depending tang of the actuator. Contactors, in pairs are clinched into the pathway or groove forming flanking paired spaced-apart parts or segments of the path. As will be appreciated the balls in their travel, on encountering the flush mounted spaced pairs of contactors, bridge across the path to close the selected circuit. The fixed spacing of ball elements differing from the fixed spacing of the plural pairs of contactors accomplish a desired sequencing and the length of the contactor elements establish the contact interval. Normally both balls are maintained out of contact relationship by the spring bias. When the bias is overcome the leading ball establishes closed contact with the first of the contactor pairs. This spaces the gap of the path as defined between one pair of contactors. Further movement places the lead ball in contact with the next of the contactor pairs. Still further movement places the lead ball out of contact with the contactor pairs bu the trailing ball, in accord with its spacing interval, closes on the first contactor pair. At this point ball travel ceases by case engagement with the ball carriage actuator or by associated stops in coordinated mechanical linkage. On release the actuator returns the balls, still in their spaced relation, to a non-contact position at the further extreme of the ball path. The case and ball carriage actuator are made of material having good dielectric strength and insulating qualities. The balls are selected from conducting materials having good wear characteristics as for example copper, tellurium, beryllium, brass and the like. The blades forming the contactor pairs are good electrical conductors such as the material forming the balls. Springs providing switch bias and ball contact bias are simple coil type compression springs and being isolated from conduction by case and actuator housing need not be of exotic or special material.

Specific description

Referring to the drawing and specifically to FIGURE 1, a switch 11 in accord with the present invention is shown. The externals of the switch 11 comprise the switch case 12 and cover 13. The case 12 will be appreciated to be generally elongate and rectangular in configuration. The cover 13 is located in closing relationship on the case 12 as by the locating protrusions 14 extending into register with corresponding recesses in the cover 13. Crimp members as tabs 15, depending from the cover 13, are provided to secure the cover 13 to the case 12. An elongate slot 16 is provided in axial elongate registry with the cavity of case 12. Through the slot 16 extends the actuator arm 17 of the actuator slider member 18. In FIGURE 1 the actuator slider member 18 is shown in its normal bias position with the arm 17 protruding from the slot 16 and in clearance relationship with the edges of margins thereof. As will be appreciated the actuator slider 8 is movable upon overcoming the bias acting against it. The cover 13 also includes a bracket or mounting portion 19 shown specifically adapted for mounting to the periphery of a steering column, not shown. As will be appreciated the switch 11 is non-detenting and requires external manual or mechanical manipulation of the arm 17 for actuation.

By reference to FIGURE 2 and 3 the switch 11 is better understood. The case member 12 is generally elongate and rectangular in form and comprises a major cavity 20 and minor cylindrical cavity 21 therethrough. The major 20 and minor 21 cavities are substantially co-extensive and are interconnected by a transverse lineal gap 22 therebetween. The major cavity 20 is blocked at both ends by the end walls 23 and 24 of the case 12. The minor cavity 21 is similarly blocked at one end by the end wall 24, but is open through the end wall 23. This, as will be seen, permits the insertion of the main bias spring 25 upon assembly. (See FIGURE 5). The actuator slider 18 is positioned in the major cavity 20 and slides along the divider 26 and is confined by the sidewalls of the case 12 for the length of the major cavity 20. The actuator slider 18 is a block of insulating material and is provided with a tang 27 which depends through the gap 22 and into the lower registering minor cavity 21. Hence the spring 25, upon assembly, at one end abuts the end wall 24 and at the other end bears yieldably against the tang 27 urging the actuator-slider 18 into a normal biased position as shown. The actuator 18 defines in its base a pair of spaced apart cylindrical recesses 28 and 29 which are in radial register with the axis of gap 22. The recesses 28 and 29 receive springs 30 and 31 respectively and conducting balls 32 and 33 respectively. This relationship is best appreciated by reference to FIGURE 5. Thus the balls 32 and 33 are caused on assembly to bridge the gap 22 intermediate the major and minor cavities 20 and 21. The balls 32 and 33 will be seen to be movable in a track formed in the case 12 and along the slot-like gap 22. The distance between balls 32 and 33 is fixed and defined by the distance between recesses 28 and 29 in the actuator slider 18. The case 12, defining the gap 22 is segmented by a flanking plurality of contactor pairs 34, 34′ and 35, 35′. The contactors 34, 34′ and 35, 35′ are made from conducting flat stock crimped into the flanks of the pathway defined by the gap 22 and in spaced-apart paired and opposite relation. Each pair of contactors, for example 34 and 34′, define terminal ends of a circuit as will be seen in FIGURE 6 and the balls 32 and 33 in spanning the gap 22 closes the circuit. Portions of the contactor pairs depend through and from the case 12 to provide lead connections to select circuits. By reference to FIGURE 7 the plate-like character of the contactors stamped from sheet or strip stock is appreciated. From these are formed integral connector prongs 36. The contactor 34 is bent as shown to nest in flush relationship in the path. Then the shoulders 37 are upset to clinch the connectors 34 securely to the case. The bending occurs after the connectors 34, 34′ and 35, 35′ have been inserted in the case 12. The body 38 of the contactor remains planal in the press fit socket through the case 12.

As thus appreciated the contactors 34, 34′ and 35, 35′ are provided in spaced-apart pairs and in ultimate flush relationship in the pathway of actuator 18 and balls 32 and 33. Hence, the contactor pairs are fixed in their spaced relation to each other and each contact interval may be of selected length. The balls 32 and 33, upon movement of the actuator 18, maintain their fixed rolling relationship and bridge the gap 22. Upon selected encounter with the contactor pairs, the balls 32 and 33 close circuits across the gap 22 as between each pair of contactors, as for example 34 and 34′.

By reference to FIGURE 4 the rolling relationship is best seen, the ball 33 spanning the gap 22 defined by both case 12 and contactors 34, 34′ and 35, 35′. As will be appreciated the contactors 34, 34′ and 35, 35′ are coplanal with the divider 26 thereby providing a floor along which the actuator 18 may slide. This is not entirely accurate since, as has been stated, the actuator 18 rides in an antifriction relationship on the balls 32 and 33 confined laterally by the walls of the case 12. The crimped edges of the contactors 34, 34′ and 35, 35′ are likewise flush with the walls defining the gap 22. In this manner smooth rolling is accomplished throughout the actuator movement and the springs 30 and 31 assure ball contact pressure. In motion the balls 32 and 33 provide a ball bearing support with ball contact tangentially applied to the balls by the edges of the gap 22. The case 12 is closed at the top by cover 13 with slot 16 allowing movement of the arm 17 and corresponding movement of the actuator 18.

In FIGURE 6 the schematic representation of the switch 11 is set forth and including the setting of use. The balls 32 and 33 are represented in full lines as positioned normally by the spring 25 acting to urge the actuator 18 in stop relation against one end of the switch case 12. The spatial relationship between the balls 32 and 33 is fixed and the motion of both is in-line controlled by the gap 22 forming the ball track. The actuator 18 in the major cavity 20 and bearing against the walls of the case 12 also confines this movement. The contactor pairs 34, 34′ and 35, 35′ are likewise in fixed spaced relationship the interval being les than the interval between balls 32 and 33, but may be varied in length to define a selected contact interval. The case 12, as will be appreciated, insulates the adjacent sets of contacts from each other. Upon movement of the balls 32 and 33 against the main spring bias, the lead ball 33 first closes the gap 22 across contact 34, 34′ at the "neutral" position to close an associated circuit designated as the "start" circuit 39. The trailing ball 32 rests against the insulating material of case 12 and as yet performs no work except that of providing a guide bearing in the gap 22. Further movement of the lead ball 33 causes the ball 33 to move off of the contact pair 34, 34′, thereby opening the "start" circuit 39 and closing the "reverse" circuit 40. At this point the trailing ball 33 is still out of contact with the contactors 34, 34′. Further movement of the lead ball 33 carries the lead ball 33 out of contact with the contactors 35, 35′ and thereby breaks the "reverse" circuit 40. This last movement, however, places the trailing ball 32 in contact between the contactors 34, 34' thereby resulting in arming of the "start" circuit 39 as shown. As will be appreciated the lineal extension of the contactor pairs is selected in accord with the contact interval desired or dimensional control in coordination with associated apparatus. As will be appreciated from the description, the specific embodiment of the switch has high utility as an automatic transmission positioning switch and accomplishes selective arming of electrical circuits in coordination with the transmission position. In either the "neutral" or the "park" positions, the starting circuit 39 is prepared for energizing the starter 41 as through the dash control 42.

As will be readily appreciated the specfic switch may be modified as desired for adaptation to specific usage. The cover, for example, may be varied to accomplish selective mounting and the plural contacts may be repositioned in accord with the control over selected circuits. The prong socket ends 36 may be differently lead into or out of the case to accommodate any specific connection. Assembly of the structure is very simple. The tang 27 retains the main spring 25 against release while maintaining the desired actuator balance. Milling of the surface 26 and edge of gap 22 is easily accomplished for extreme accuracy and the entire case 12 is formed for press fit insertion of the prong extension contactors. The arrangement of the case 12 is such as to retain the spring 25 in the cylindrical minor recess 21 thereby effectively separating the spring 25 from the major recess 20 and thereby avoiding any chance of circuit interference.

In operation the described switches have provided long life and trouble free performance despite relatively heavy loading of circuits.

Having thus described my invention, modifications and improvements therein will be readily apparent to those skilled in the art. Such modifications and improvements are intended to be included herein as falling within the scope of the present invention limited only by the scope of the hereinafter appended claims.

I claim:

1. An electrical switch comprising: a pair of conducting balls; an actuator spacing said balls apart from each other; a case of insulating material in which said actuator is movable; a communicating gap defined in said case, said communicating gap constituting a path for said balls; a plurality of pairs of contactors through said case, each pair spaced apart from the adjacent pair and each contactor in said pairs in spaced-apart gapping relation in said path; and a spring bias located beneath and parallel to said gap acting through said gap upon said actuator.

2. An electrical switch comprising: a pair of conducting balls; an actuator spacing said balls apart from each other; a tang depending from said actuator; a case of insulating material defining a major elongate recess in which said actuator is movable and defining a minor cylindrical recess parallel to and offset from said major recess, said minor recess being closed at one end and a communicating gap or slot between said major and minor recesses and through which said tang extends; a spring in said minor cylindrical recess abutting said case at one end and engaging said depending tang at the other end; and a plurality of contactor pairs flanking said communicating gap and with said gap defining a path for movement of said balls, said contactors in fixed relation through said case.

3. The combination as set forth in claim 2 wherein said actuator is provided with ball receiving recesses and springs in said recesses applying resilient contact bias to said balls.

4. The combination as set forth in claim 2 wherein said contactor pairs are of selected width to provide selected contact interval with said balls.

5. In an electrical switch for transmission indicator usage in automobiles, the combination comprising: an elongate switch case of a dielectric material; a divider in said case defining a major elongate recess and a minor cylindrical recess, said cylindrical recess being in gapped communication with said major recess and open at one end; an actuator slider in said case and longitudinally movable therein; an arm extending from said actuator; a tang depending from said actuator and into said minor recess; resilient means in said actuator in spaced apart relation; balls of conducting material in yielding contact with said springs and urged thereby into rolling contact in a track formed by said gap between said major and minor recesses; a spring in said minor recess acting against said case at one end and against said tang at the other end; and contactors flanking said gap for selected interval contact with one or the other of said balls in fixed sequence, thereby energizing selected circuits in accord with the position of said balls.

References Cited by the Examiner

UNITED STATES PATENTS

| | | | |
|---|---|---|---|
| 1,231,732 | 7/17 | Halbleib | 200—52 |
| 2,528,035 | 10/50 | Clayton | 200—16 |
| 2,919,315 | 12/59 | Woofter | 200—16 |
| 3,024,334 | 3/62 | Rhodes | 200—166 |

BERNARD A. GILHEANY, *Primary Examiner.*